(12) United States Patent
Huang

(10) Patent No.: US 9,465,944 B2
(45) Date of Patent: Oct. 11, 2016

(54) ELECTRONIC SYSTEM, ELECTRONIC DEVICE AND METHOD CAPABLE OF ERASING PASSWORD FROM BASIC INPUT/OUTPUT SYSTEM AUTOMATICALLY

(71) Applicant: Wistron Corporation, New Taipei (TW)

(72) Inventor: Jian-Dong Huang, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 14/557,407

(22) Filed: Dec. 1, 2014

(65) Prior Publication Data

US 2016/0034676 A1 Feb. 4, 2016

(30) Foreign Application Priority Data

Jul. 30, 2014 (TW) .............................. 103126039 A

(51) Int. Cl.
*G06F 7/14* (2006.01)
*G06F 21/57* (2013.01)
*G06F 21/31* (2013.01)
*G06F 21/46* (2013.01)
*G06F 21/34* (2013.01)

(52) U.S. Cl.
CPC .............. *G06F 21/572* (2013.01); *G06F 21/31* (2013.01); *G06F 21/34* (2013.01); *G06F 21/46* (2013.01); *G06F 2221/2143* (2013.01)

(58) Field of Classification Search
CPC .............................. G06F 21/31; G06F 21/572
USPC ......................................................... 726/18
See application file for complete search history.

(56) References Cited

U.S. PATENT DOCUMENTS 4,937,861 A 6/1990 Cummins
6,725,382 B1 * 4/2004 Thompson .............. G06F 21/34
340/5.54

(Continued)

FOREIGN PATENT DOCUMENTS

CN 101727558 10/2012
TW 200617736 6/2006
TW I268081 12/2006

OTHER PUBLICATIONS

Zhenliu Zhou et al., "Detection about Vulnerabilities and Malicious codes for Legacy BIOS," 2010 Second International Conference on Communication Systems, Networks and Applications, IEEE, pp. 77-80.*

(Continued)

*Primary Examiner* — Luu Pham
*Assistant Examiner* — Canh Le
(74) *Attorney, Agent, or Firm* — Winston Hsu; Scott Margo

(57) ABSTRACT

A method capable of erasing a password from a BIOS automatically includes steps of the BIOS determining whether a password erasing flag has been set when an electronic device is booting; the BIOS erasing the password if the password erasing flag has been set; the BIOS displaying a password input window if the password erasing flag has not been set; inputting a comparison data in the password input window; the electronic device transmitting the comparison data to a server; the server comparing the comparison data with a registration data, generating a comparison result, and transmitting the comparison result to the electronic device; the BIOS determining whether the comparison result is correct; the BIOS setting the password erasing flag and rebooting the electronic device if the comparison result is correct; and the BIOS rebooting the electronic device directly if the comparison result is wrong.

12 Claims, 3 Drawing Sheets

(56) References Cited

U.S. PATENT DOCUMENTS

| | | | |
|---|---|---|---|
| 2003/0070102 A1* | 4/2003 | Kondo | G06F 21/31 726/23 |
| 2004/0268073 A1* | 12/2004 | Morisawa | G06F 21/80 711/164 |
| 2012/0011577 A1* | 1/2012 | Mashimo | G06F 21/31 726/7 |
| 2013/0185789 A1* | 7/2013 | Hagiwara | G06F 21/45 726/18 |
| 2015/0205972 A1* | 7/2015 | Huang | G06F 21/88 726/27 |

OTHER PUBLICATIONS

Tilo Muller et al. "Self-Encrypting Disks pose Self-Decrypting Risks," the 29$^{th}$ Chaos Communinication Congress, Dec. 2012, pp. 1-10.*

Office action mailed on Aug. 25, 2015 for the Taiwan application No. 103126039, filing date: Jul. 30, 2014, p. 1 line 14, p. 2~3, p. 4 line 1~4 and p. 5 line 3~12.

* cited by examiner

ELECTRONIC SYSTEM, ELECTRONIC DEVICE AND METHOD CAPABLE OF ERASING PASSWORD FROM BASIC INPUT/OUTPUT SYSTEM AUTOMATICALLY

BACKGROUND OF THE INVENTION

1. Field of the Invention

The invention relates to an electronic device having a basic input/output system (BIOS) and, more particularly, to an electronic system, an electronic device and a method capable of erasing a password from a BIOS automatically.

2. Description of the Prior Art

A basic input/output system (BIOS) is used to execute self-inspection and operating system when a computer is being booted. When the computer is powered on, the BIOS is executed in a flash memory installed on a main board to initialize chip set and memory subsystem. The main function of the BIOS is to ensure that some important hardware components (e.g. keyboard, disc device, input/output port, etc.) can work normally and be initialized accurately. In general, a user may set a password for the BIOS, a hard disc, and so on in the BIOS, so as to prevent the important information stored in the computer from being leaked. However, once the user forgets the password, the user has to spend a lot of time to contact a customer service officer of a service provider and then confirm a registration data with the customer service officer, so as to unlock the BIOS or the hard disc. The aforesaid manner is inconvenient and may cause unnecessary loss to the user.

SUMMARY OF THE INVENTION

The invention provides an electronic system, an electronic device and a method capable of erasing a password from a basic input/output system (BIOS) automatically, so as to solve the aforesaid problems.

According to the claimed invention, an electronic system is capable of erasing a password from a basic input/output system (BIOS) automatically. The electronic system comprises a server and an electronic device. The server comprises a first processing unit, a first storage unit and a first communication unit. The first processing unit is electrically connected to the first storage unit and the first communication unit. The first storage unit stores a registration data. The registration data comprises a registration code and a device serial number. The electronic device has the registration code and the device serial number. The electronic device comprises a second processing unit, a second storage unit, a second communication unit, a BIOS memory, a display unit and an input unit. The second processing unit is electrically connected to the second communication unit, the BIOS memory, the display unit and the input unit. The second storage unit is electrically connected to the BIOS memory. The second communication unit communicates with the first communication unit. The BIOS memory stores the BIOS. The BIOS records at least one password. When the electronic device is booting, the BIOS determines whether a password erasing flag has been set. If the password erasing flag has been set, the BIOS erases the at least one password. If the password erasing flag has not been set, the BIOS displays a password input window in the display unit. After the input unit is operated to input a comparison data in the password input window, the second processing unit transmits the comparison data to the server through the second communication unit and the first communication unit, wherein the comparison data comprises the registration code and the device serial number. The first processing unit compares the comparison data with the registration data, generates a comparison result, and transmits the comparison result to the electronic device through the first communication unit and the second communication unit. The BIOS determines whether the comparison result is correct. If the comparison result is correct, the BIOS sets the password erasing flag and reboots the electronic device. If the comparison result is wrong, the BIOS reboots the electronic device directly.

According to the claimed invention, the electronic device further has a warranty date, the registration data further comprises the warranty date, and the comparison data further comprises the warranty date.

According to the claimed invention, the at least one password comprises at least one of a password of the BIOS and a password of the second storage unit.

According to the claimed invention, after erasing the at least one password, the BIOS displays an information, which indicates that the at least one password has been erased, in the display unit.

According to the claimed invention, an electronic device is capable of erasing a password from a basic input/output system (BIOS) automatically. The electronic device communicates with a server. The electronic device has a registration code and a device serial number. The server comprises a first processing unit, a first storage unit and a first communication unit. The first processing unit is electrically connected to the first storage unit and the first communication unit. The first storage unit stores a registration data. The registration data comprises the registration code and the device serial number. The electronic device comprises a second storage unit, a second communication unit, a BIOS memory, a display unit, an input unit and a second processing unit. The second communication unit communicates with the first communication unit. The BIOS memory is electrically connected to the second storage unit. The BIOS memory stores the BIOS. The BIOS records at least one password. The second processing unit is electrically connected to the second communication unit, the BIOS memory, the display unit and the input unit. When the electronic device is booting, the BIOS determines whether a password erasing flag has been set. If the password erasing flag has been set, the BIOS erases the at least one password. If the password erasing flag has not been set, the BIOS displays a password input window in the display unit. After the input unit is operated to input a comparison data in the password input window, the second processing unit transmits the comparison data to the server through the second communication unit and the first communication unit, wherein the comparison data comprises the registration code and the device serial number. The first processing unit compares the comparison data with the registration data, generates a comparison result, and transmits the comparison result to the electronic device through the first communication unit and the second communication unit. The BIOS determines whether the comparison result is correct. If the comparison result is correct, the BIOS sets the password erasing flag and reboots the electronic device. If the comparison result is wrong, the BIOS reboots the electronic device directly.

According to the claimed invention, the electronic device further has a warranty date, the registration data further comprises the warranty date, and the comparison data further comprises the warranty date.

According to the claimed invention, the at least one password comprises at least one of a password of the BIOS and a password of the second storage unit.

According to the claimed invention, after erasing the at least one password, the BIOS displays an information, which indicates that the at least one password has been erased, in the display unit.

According to the claimed invention, a method is capable of erasing a password from a basic input/output system (BIOS) automatically. The method is applied to an electronic device. The electronic device has a BIOS, a registration code and a device serial number. The BIOS records at least one password. The method comprises steps of the BIOS determining whether a password erasing flag has been set when the electronic device is booting; the BIOS erasing the at least one password if the password erasing flag has been set; the BIOS displaying a password input window if the password erasing flag has not been set; inputting a comparison data in the password input window; the electronic device transmitting the comparison data to a server, wherein the server stores a registration data, the registration data comprises the registration code and the device serial number, and the comparison data comprises the registration code and the device serial number; the server comparing the comparison data with the registration data, generating a comparison result, and transmitting the comparison result to the electronic device; the BIOS determining whether the comparison result is correct; the BIOS setting the password erasing flag and rebooting the electronic device if the comparison result is correct; and the BIOS rebooting the electronic device directly if the comparison result is wrong.

According to the claimed invention, the electronic device further has a warranty date, the registration data further comprises the warranty date, and the comparison data further comprises the warranty date.

According to the claimed invention, the at least one password comprises at least one of a password of the BIOS and a password of the second storage unit.

According to the claimed invention, the method further comprises step of the BIOS displaying an information, which indicates that the at least one password has been erased, after erasing the at least one password.

As mentioned in the above, once a user forgets the password (e.g. the password of the BIOS, the password of the storage unit, and so on) set in the BIOS, the user enables the electronic device to communicate with the server of a service provider through the internet first. Afterward, the user inputs the comparison data (e.g. the registration code, the device serial number and/or the warranty date of the electronic device) in the password input window for unlock purpose and then the BIOS transmits the comparison data to the server of the service provider through the internet. After receiving the comparison data, the server of the service provider compares the comparison data with the registration data of the electronic device and transmits the comparison result to the electronic device through the internet. If the BIOS determines that the comparison result is correct, the BIOS sets the password erasing flag and reboots the electronic device. When the BIOS reads the password erasing flag after rebooting the electronic device, the BIOS erases the password set in the BIOS automatically. Accordingly, the user can unlock the electronic device rapidly as he/she forgets the password. It should be noted that if the BIOS determines that the comparison result is wrong, the BIOS just reboots the electronic device directly without modifying the password until the user inputs correct comparison data.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
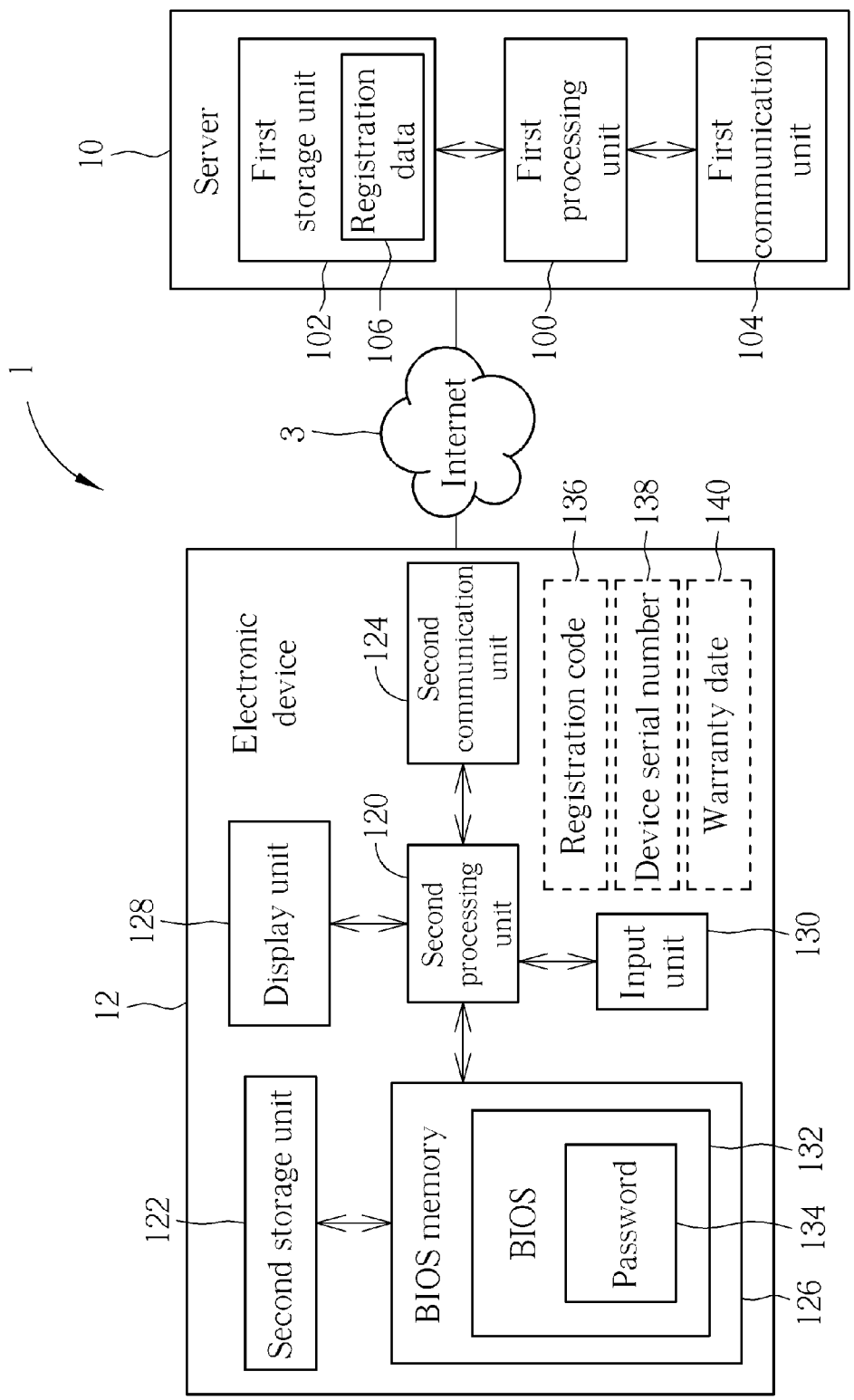
FIG. 1 is a functional block diagram illustrating an electronic system capable of erasing a password from a BIOS automatically according to an embodiment of the invention.
Figure 2:
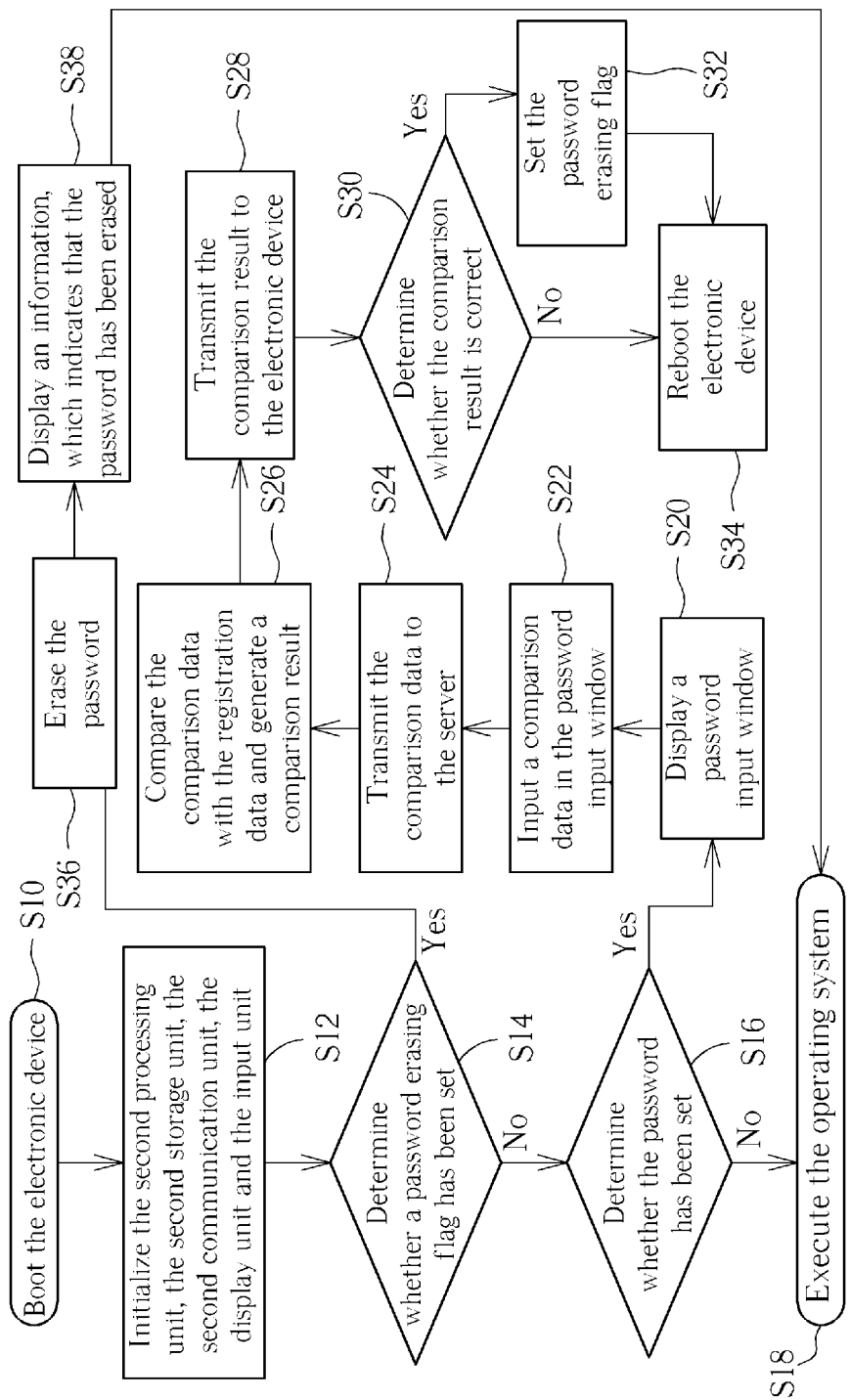
FIG. 2 is a flowchart illustrating a method capable of erasing a password from a BIOS automatically according to an embodiment of the invention.
Figure 3:
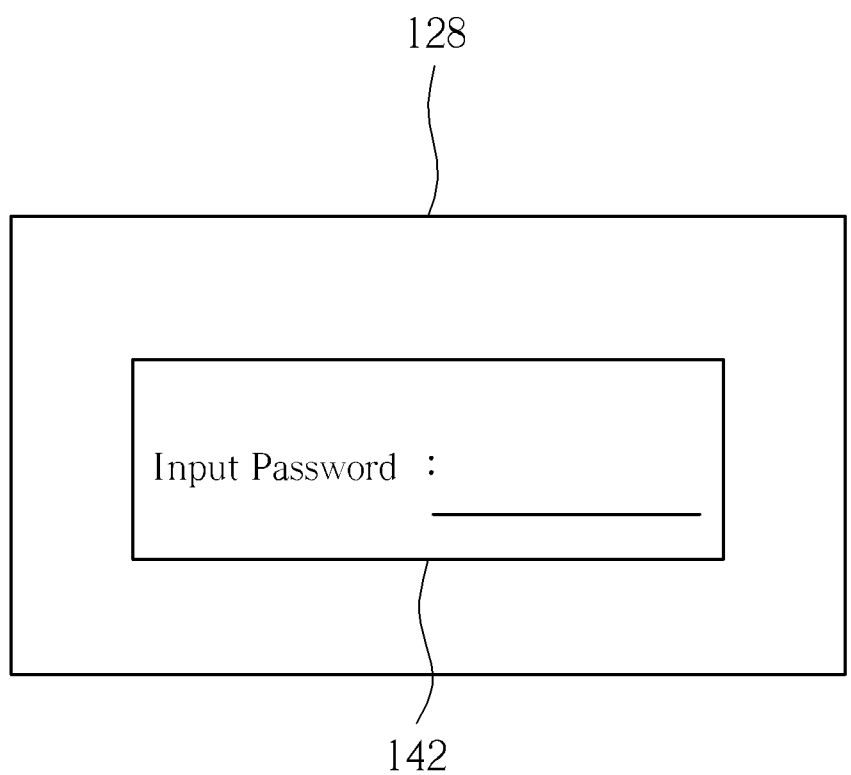
FIG. 3 is a schematic diagram illustrating a password input window displayed by the display unit shown in FIG. 1.

Referring to FIGS. 1 to 3, FIG. 1 is a functional block diagram illustrating an electronic system 1 capable of erasing a password from a basic input/output system (BIOS) automatically according to an embodiment of the invention, FIG. 2 is a flowchart illustrating a method capable of erasing a password from a BIOS automatically according to an embodiment of the invention, and FIG. 3 is a schematic diagram illustrating a password input window 142 displayed by the display unit 128 shown in FIG. 1. The method capable of erasing the password from the BIOS automatically shown in FIG. 2 is applied to the electronic system 1 shown in FIG. 1.

As shown in FIG. 1, the electronic system 1 comprises a server 10 and an electronic device 12. The server 10 comprises a first processing unit 100, a first storage unit 102 and a first communication unit 104, wherein the first processing unit 100 is electrically connected to the first storage unit 102 and the first communication unit 104. The electronic device 12 comprises a second processing unit 120, a second storage unit 122, a second communication unit 124, a BIOS memory 126, a display unit 128 and an input unit 130, wherein the second processing unit 120 is electrically connected to the second communication unit 124, the BIOS memory 126, the display unit 128 and the input unit 130, and the second storage unit 122 is electrically connected to the BIOS memory 126. The second communication unit 124 may communicate with the first communication unit 104 through the internet 3, such that the server 10 and the electronic device 12 may transmit data to each other through the internet 3.

In this embodiment, the server 10 is provided by a service provider associated with the electronic device 12. The electronic device 12 may be a computer or other electronic devices equipped with a BIOS. Furthermore, the first processing unit 100 and the second processing unit 120 may be processors or controllers with data processing function; the first storage unit 102 and the second storage unit 122 may be hard discs or other data storage devices; the first communication unit 104 and the second communication unit 124 may be internet communication interfaces or other communication modules; the BIOS memory 126 may be a flash memory or other memories; the display unit 128 may be a liquid crystal display device or other display devices; and the input unit 130 may be a keyboard, a touch panel or other input devices. Moreover, the server 10 and the electronic device 12 may be further equipped with some necessary hardware or software components for specific purposes, such as a power supply, a circuit board, applications, an operating system, etc., and it depends on practical applications.

The BIOS 126 stores a BIOS 132 and the BIOS 132 records at least one password 134. In this embodiment, the password 134 may comprises at least one of a password of the BIOS 132 and a password of the second storage unit 122. The password 134 is set in the BIOS 132 by a user in advance, so as to prevent the important information stored in the electronic device 12 from being leaked. It should be noted that if the user does not set the password 134 in the BIOS 132, the BIOS 132 does not record the password 134 accordingly.

In general, the electronic device 12 has a registration code 136, a device serial number 138 and a warranty date 140. After purchasing the electronic device 12, the user can register the aforesaid data in the server 10 provided by the service provider through the internet 3. After finishing registration, the first storage unit 102 of the server 10 stores a registration data 106 of the electronic device 12, wherein the registration data 106 comprises the registration code 136, the device serial number 138 and the warranty date 140 accordingly.

When the user wants to use the electronic device 12, he/she has to boot the electronic device 12 (step S10 in FIG. 2). Afterward, the BIOS 132 initializes the second processing unit 120, the second storage unit 122, the second communication unit 124, the display unit 128 and the input unit 130 (step S12 in FIG. 2). Then, the BIOS 132 determines whether a password erasing flag has been set (step S14 in FIG. 2). If the password erasing flag has not been set, the BIOS 132 further determines whether the password 134 has been set (step S16 in FIG. 2). If the user does not set the password 134 in the BIOS 132, the BIOS 132 executes the operating system directly (step S18 in FIG. 2).

In step S16, if the user has set the password 134 in the BIOS 132, the BIOS 132 displays a password input window 142 in the display unit 128 (step S20 in FIG. 2). As shown in FIG. 3, the user can input the password 134 in the password input window 142 to execute the operating system. However, once the user forgets the password 134 set in the BIOS 132, the user can operate the input unit 130 to input a comparison data in the password input window 142 (step S22 in FIG. 2), wherein the comparison data may comprise the registration code 136 and the device serial number 138 of the electronic device 12. In another embodiment, the comparison data may comprise the registration code 136, the device serial number 138 and the warranty date 140 of the electronic device 12. In another embodiment, the comparison data may also comprise other data associated with the electronic device 12 according to practical applications.

After the input unit 130 is operated to input the comparison data in the password input window 142, the second processing unit 120 of the electronic device 12 transmits the comparison data to the server 10 through the second communication unit 124 and the first communication unit 104 (step S24 in FIG. 2). Then, the first processing unit 100 of the server 10 compares the comparison data with the registration data 106 of the electronic device 12 and generates a comparison result (step S26 in FIG. 2). Then, the first processing unit 100 of the server 10 transmits the comparison result to the electronic device 12 through the first communication unit 104 and the second communication unit 124 (step S28 in FIG. 2).

After receiving the comparison result, the BIOS 132 determines whether the comparison result is correct (step S30 in FIG. 2). If the comparison result is correct, the BIOS 132 sets the password erasing flag (step S32 in FIG. 2) and reboots the electronic device 12 (step S34 in FIG. 2). When the BIOS 132 reads the password erasing flag after rebooting the electronic device 12 (i.e. the BIOS 132 determines that the password erasing flag has been set in step S14), the BIOS 132 erases the password 134 set in the BIOS 132 automatically (step S36 in FIG. 2). After erasing the password 134, the BIOS 132 may display an information, which indicates that the password 134 has been erased, in the display unit 128 (step S38 in FIG. 2), so as to notify the user to set a new password. Then, the BIOS 132 executes the operating system (step S18 in FIG. 2).

It should be noted that if the BIOS 132 determines that the comparison result is wrong in step S30, the BIOS 132 reboots the electronic device 12 directly (step S34 in FIG. 2) without setting the aforesaid password erasing flag. When the BIOS 132 cannot read the password erasing flag after rebooting the electronic device 12 (i.e. the BIOS 132 determines that the password erasing flag has not been set in step S14), step S20 will be performed again without modifying the password 134 until the user inputs correct comparison data.

As mentioned in the above, once a user forgets the password (e.g. the password of the BIOS, the password of the storage unit, and so on) set in the BIOS, the user enables the electronic device to communicate with the server of a service provider through the internet first. Afterward, the user inputs the comparison data (e.g. the registration code, the device serial number and/or the warranty date of the electronic device) in the password input window for unlock purpose and then the BIOS transmits the comparison data to the server of the service provider through the internet. After receiving the comparison data, the server of the service provider compares the comparison data with the registration data of the electronic device and transmits the comparison result to the electronic device through the internet. If the BIOS determines that the comparison result is correct, the BIOS sets the password erasing flag and reboots the electronic device. When the BIOS reads the password erasing flag after rebooting the electronic device, the BIOS erases the password set in the BIOS automatically. Accordingly, the user can unlock the electronic device rapidly as he/she forgets the password. It should be noted that if the BIOS determines that the comparison result is wrong, the BIOS just reboots the electronic device directly without modifying the password until the user inputs correct comparison data.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic system capable of erasing a password from a basic input/output system (BIOS) automatically comprising:

a server comprising a first processing unit, a first storage unit and a first communication unit, the first processing unit being electrically connected to the first storage unit and the first communication unit, the first storage unit storing a registration data, the registration data comprising a registration code and a device serial number; and an electronic device having the registration code and the device serial number, the electronic device comprising a second processing unit, a second storage unit, a second communication unit, a BIOS memory, a display unit and an input unit, the second processing unit being electrically connected to the second communication unit, the BIOS memory, the display unit and the input unit, the second storage unit being electrically connected to the BIOS memory, the second communication unit communicating with the first communication unit, the BIOS memory storing the BIOS, the BIOS recording at least one password;

wherein the BIOS is configured to determine whether a password erasing flag has been set when the electronic device is booting;

the BIOS is configured to erase the at least one password when the password erasing flag has been set;

the BIOS is configured to display a password input window in the display unit when the password erasing flag has not been set;

the second processing unit is configured to transmit a comparison data to the server through the second communication unit and the first communication unit after the input unit is operated to input the comparison data in the password input window, the comparison data comprising the registration code and the device serial number;

the first processing unit is configured to compare the comparison data with the registration data, generate a comparison result, and transmit the comparison result to the electronic device through the first communication unit and the second communication unit;

the BIOS is configured to determine whether the comparison result is correct;

the BIOS is configured to set the password erasing flag and reboot the electronic device when the comparison result is correct; and the BIOS is configured to reboot the electronic device directly when the comparison result is wrong.

2. The electronic system of claim 1, wherein the electronic device further has a warranty date, the registration data further comprises the warranty date, and the comparison data further comprises the warranty date.

3. The electronic system of claim 1, wherein the at least one password comprises at least one of a password of the BIOS and a password of the second storage unit.

4. The electronic system of claim 1, wherein after erasing the at least one password, the BIOS is configure to display an information, which indicates that the at least one password has been erased, in the display unit.

5. An electronic device capable of erasing a password from a basic input/output system (BIOS) automatically, the electronic device communicating with a server, the electronic device having a registration code and a device serial number, the server comprising a first processing unit, a first storage unit and a first communication unit, the first processing unit being electrically connected to the first storage unit and the first communication unit, the first storage unit storing a registration data, the registration data comprising the registration code and the device serial number, the electronic device comprising:

a second storage unit;

a second communication unit communicating with the first communication unit;

a BIOS memory electrically connected to the second storage unit, the BIOS memory storing the BIOS, the BIOS recording at least one password;

a display unit;

an input unit; and a second processing unit electrically connected to the second communication unit, the BIOS memory, the display unit and the input unit;

wherein the BIOS is configured to determine whether a password erasing flag has been set when the electronic device is booting;

the BIOS is configured to erase the at least one password when the password erasing flag has been set;

the BIOS is configured to display a password input window in the display unit when the password erasing flag has not been set;

the second processing unit is configured to transmit a comparison data to the server through the second communication unit and the first communication unit after the input unit is operated to input the comparison data in the password input window, the comparison data comprising the registration code and the device serial number;

the first processing unit is configured to compare the comparison data with the registration data, generate a comparison result, and transmit the comparison result to the electronic device through the first communication unit and the second communication unit;

the BIOS is configured to determine whether the comparison result is correct;

the BIOS is configured to set the password erasing flag and reboot the electronic device when the comparison result is correct; and the BIOS is configured to reboot the electronic device directly when the comparison result is wrong.

6. The electronic device of claim 5, wherein the electronic device further has a warranty date, the registration data further comprises the warranty date, and the comparison data further comprises the warranty date.

7. The electronic device of claim 5, wherein the at least one password comprises at least one of a password of the BIOS and a password of the second storage unit.

8. The electronic device of claim 5, wherein after erasing the at least one password, the BIOS is configure to display an information, which indicates that the at least one password has been erased, in the display unit.

9. A method for erasing a password from a basic input/output system (BIOS) automatically, the method being applied to an electronic device, the electronic device having a BIOS, a registration code and a device serial number, the BIOS recording at least one password, the method comprising:

determining, by the BIOS, whether a password erasing flag has been set when the electronic device is booting;

erasing, by the BIOS, the at least one password if the password erasing flag has been set;

displaying, by the BIOS, a password input window if the password erasing flag has not been set;

inputting a comparison data in the password input window;

transmitting, by the electronic device, the comparison data to a server, wherein the server stores a registration data, the registration data comprises the registration code and the device serial number, and the comparison data comprises the registration code and the device serial number;

comparing, by the server, the comparison data with the registration data, generating a comparison result, and transmitting the comparison result to the electronic device;

determining, by the BIOS, whether the comparison result is correct;

setting, by the BIOS, the password erasing flag and rebooting the electronic device if the comparison result is correct; and rebooting, by the BIOS, the electronic device directly if the comparison result is wrong.

10. The method of claim 9, wherein the electronic device further has a warranty date, the registration data further comprises the warranty date, and the comparison data further comprises the warranty date.

11. The method of claim 9, wherein the at least one password comprises at least one of a password of the BIOS and a password of the second storage unit.

12. The method of claim 9, further comprising:

displaying, by the BIOS, an information, which indicates that the at least one password has been erased, after erasing the at least one password.

* * * * *